United States Patent [19]

Saito

[11] Patent Number: 4,583,139
[45] Date of Patent: Apr. 15, 1986

[54] REVERSING TAPE RECORDER

[75] Inventor: Ryoichi Saito, Kakuda, Japan

[73] Assignee: Alps Electric Co., Ltd., Japan

[21] Appl. No.: 411,359

[22] Filed: Aug. 25, 1982

[30] Foreign Application Priority Data

Aug. 26, 1981 [JP] Japan .................... 56-126159[U]

[51] Int. Cl.⁴ .................. G11B 5/008; G11B 15/00; G11B 17/00; G11B 5/54
[52] U.S. Cl. .................. 360/96.2; 360/96.1; 360/96.3; 360/105
[58] Field of Search .................. 360/96.1, 96.2, 96.3, 360/96.4, 105

[56] References Cited

U.S. PATENT DOCUMENTS

| | | | |
|---|---|---|---|
| 3,806,666 | 4/1974 | Hashizume et al. | 360/96.4 |
| 3,987,486 | 10/1976 | Ito et al. | 360/96.2 |
| 4,214,283 | 7/1980 | Fushimi et al. | 360/105 |
| 4,358,809 | 3/1980 | Uehara | 360/105 |
| 4,383,282 | 5/1983 | Osanai | 360/96.3 |
| 4,403,266 | 9/1983 | Kamimura | 360/105 |
| 4,408,237 | 10/1983 | Takahashi et al. | 360/96.4 |

FOREIGN PATENT DOCUMENTS

| | | | |
|---|---|---|---|
| 47-40803 | 4/1967 | Japan | 360/105 |
| 54-139704 | 10/1979 | Japan | 96.2/ |
| 55-70955 | 5/1980 | Japan | 360/96.4 |
| 55-84063 | 6/1980 | Japan | 360/96.1 |

Primary Examiner—John H. Wolff
Assistant Examiner—Alfonso Garcia
Attorney, Agent, or Firm—Guy W. Shoup

[57] ABSTRACT

A reversing tape recorder which has an improved mechanism for applying pressure from pinch rollers against the tape. One spring is used in common for both pinch rollers so that a head base is moved against the resilience of only this spring. This arrangement makes it possible to changeover the operation of tape travel lightly, smoothly and reliably.

1 Claim, 13 Drawing Figures

REVERSING TAPE RECORDER

BACKGROUND OF THE INVENTION

This invention relates to a reversing tape recorder (including a tape player) in which capstans are disposed at two positions.

In a double capstan type tape recorder in which the direction of travel of the tape is automatically reversed from both the normal and reverse directions while the tape is kept loaded, capstans are disposed at two positions and two pinch rollers are alternately pushed against the capstan shafts so as to drive the tape in the normal and reverse directions, respectively. In other words, when the end of the tape is reached, the pinch rollers are changed over either by detecting the end of the tape or by changing the pinch rollers over manually so as to reverse the direction of travel of the tape.

Figure 1:
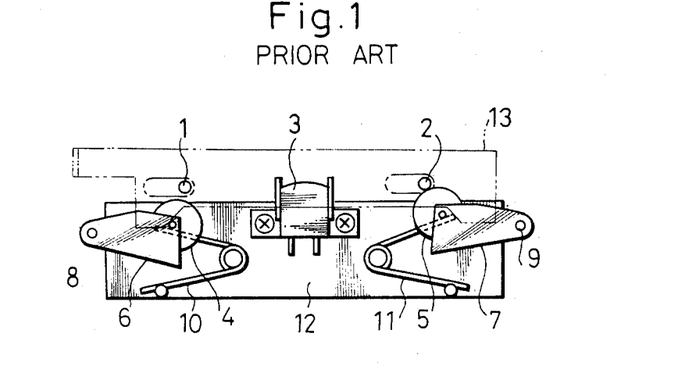
FIG. 1 is a schematic view of the principal portions of a conventional reversing tape recorder.

A conventional double capstan type tape recorder is illustrated in FIG. 1. Two capstans 1 and 2 are disposed with a magnetic head 3 between them. Two pinch rollers 4, 5 are disposed corresponding to the capstans, respectively. Pinch rollers holding frames 6, 7 hold the pinch rollers 4, 5 at their respective tips and are rotatably supported at their base portions by means of pins 8, 9, respectively. The pinch rollers 4, 5 are constantly urged towards the capstans 1, 2 by springs 10, 11, respectively. When the trailing end of the tape (not shown) is reached, an electromagnetic mechanism (not shown) is actuated and a change-over plate 13 is moved, to the right and left in the drawing, thereby changing over the pinch rollers 4 and 5. In FIG. 1, the righthand pinch roller 5 is shown engaged with capstan 2 to feed the tape to the right.

In the reversing tape recorder of this kind, separate springs 10, 11 are disposed for the two pinch rollers 4, 5, respectively. These springs have resilience for providing the necessary pressure. For this reason, when a head base 12 is to be moved, for instance, the head base 12 must be moved against the force of the two springs 10, 11. In other words, the total resilience of these springs acts as the resistance. Hence, a driving mechanism having a large torque must be employed.

SUMMARY OF THE INVENTION

The present invention comtemplates to eliminate the problem with the prior art as described above and is directed to ensure a light and smooth changeover of tape travel by improving the mechanism for applying the predetermined pressure of the pinch roller against the tape.

DESCRIPTION OF THE PREFERRED EMBODIMENTS

Preferred embodiments of the present invention will now be described with reference to the figures starting from FIG. 2.

Figure 2:
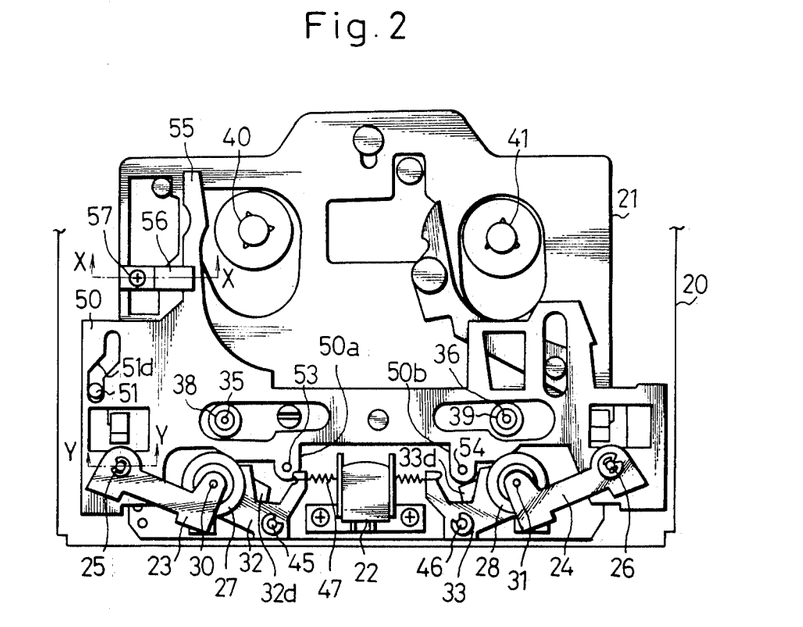
FIG. 2 is a schematic plan view of the reversing tape recorder in accordance with the present invention in the non-play (stop) mode.
Figure 3:
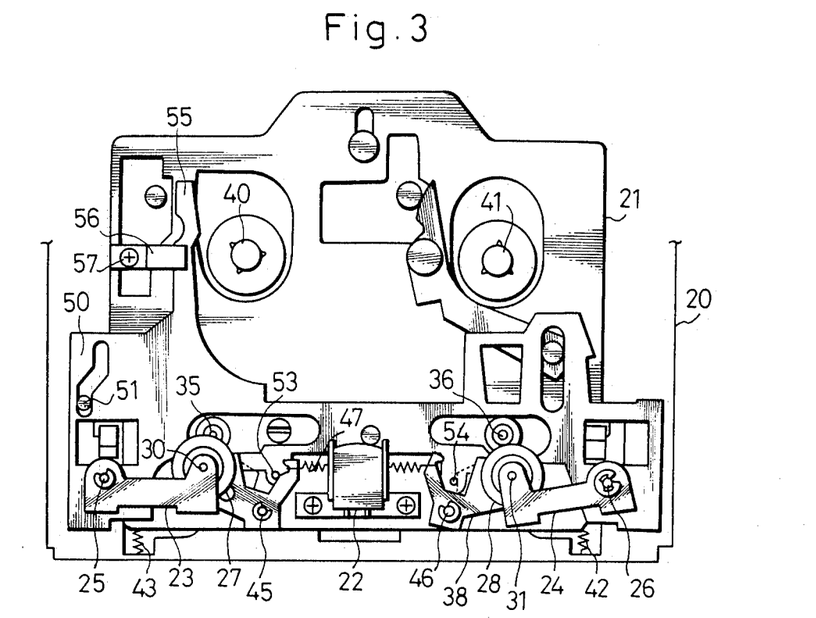
FIG. 3 is a schematic plan view of the present tape recorder in the play mode.

In FIGS. 2 and 3, reference numeral 20 represents the chassis of the tape recorder. A head base 21 is disposed on the chassis so that it can slide between the play position and the non-play position. A magnetic head 22 is mounted on the head base 21. A heretofore known mechanism is employed as the mechanism for supporting the head base 21 at the play position, and so the mechanism is not shown in the drawing to simplify the illustration. Reference numerals 23 and 24 represent pinch roller holding frames fitted to the chassis 20 by shafts 25 and 26, respectively, so that they can rotate between the play position and the non-play position. Reference numerals 27 and 28 represent pinch rollers that are fitted to the pinch roller holding frames 23, 24 by means of fitting shafts 30, 31, respectively.

The fitting shafts 30, 31 of the pinch rollers 27, 28 project from the pinch roller holding frames 23, 24 towards the chassis 20 through holes 32a, 33a in driving members 32, 33 (see FIGS. 4 and 5) and through holes 21a, 21b in the head base 21.

Reference numerals 35 and 36 represent first and second capstan shafts, respectively, that are equipped with fly wheels (not shown). A gear 37 (see FIGS. 7A and 7B) is fixed at one end of the capstan shaft 35 while a gear for moving the head base 21 and the like is fixed at one end of the other capstan shaft 36. However, the latter gear is not shown in the drawing. Reference numerals 40 and 41 represent take-up and feed reel shafts that are driven to rotate in the normal and reverse directions by a reversing mechanism (not shown).

Reference numerals 42 and 43 represent coil springs that are stretched between the chassis 20 and the head base 21 and constantly urge the head base 21 to the non-play (stop) position.

Reference numerals 45 and 46 represent pins for rotatably fitting the driving members 32, 33 to the head base 21, respectively.

Reference numeral 47 represents a spring that is stretched between the driving members 32 and 33 and constantly urges one (32) of the driving members clockwise and the other one (33), counter-clockwise.

Figure 4:
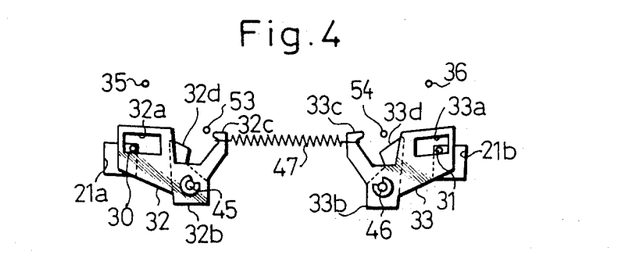
FIGS. 4 and 5 are detailed schematic views showing the relative positions between the changeover mechanism and the driving member.
Figure 5:
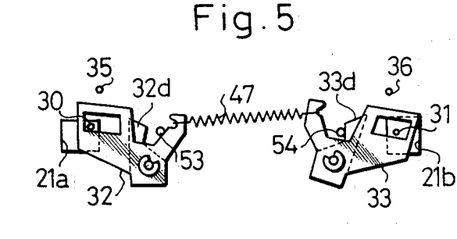
Figure 6:
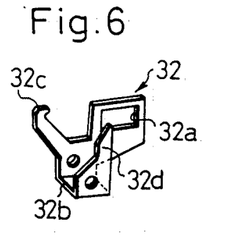
FIG. 6 is a perspective view of the driving member.

When viewed as a whole in the transverse direction, each driving member 32, 33 has a substantially ⊐-shaped sheet-like form. As shown in FIGS. 4 through 6 in further detail, the pins 45, 46 pass through the driving members at positions close to their bent portions 32b, 33b, by which the driving members 32, 33 are rotatably supported on the head base 21. An anchor portion 32c, 33c is defined at one end of the upper plate of each driving member and both ends of the spring 47 are anchored to these anchor portions 32c, 33c. The aforementioned holes 32a, 33a are defined at the other end of the upper plates of the driving members. These holes are positioned to correspond to the holes 21a, 21b in the head base 21 and the pinch roller fitting shafts 30 31 pass through these holes 32a, 33a. The lower plates of the driving members 32, 33 have a projecting form and substantially <-shaped anchor portions 32d, 33d are defined there.

Turning back to FIGS. 2 and 3, reference numeral 50 represents a changeover plate that forms a part of the changeover mechanism. The changeover plate is fitted so as to be capable of sliding with respect to the head base 21 and is moved to the right and left in FIGS. 2 and 3 by a changeover lever 51.

Projecting plates 50a, 50b are defined at the positions of the changeover plate 50 that oppose the abovementioned anchor portions 32d, 33d of the driving members 32, 33. Anchor pins 53, 54 are fixed to the projecting plates extending downward. When the changeover plate 50 is at the extreme right position (FIG. 2), the left anchor pin 53 is to the right away from the anchor portion 32d of driving member 32 while the right anchor pin 54 is positioned immediately above the anchor portion 33d of driving member 33. When the changeover plate 50 is at the extreme left position, the relation between the positions of the anchor pins 53, 54 and the anchor portions 32d, 33d of the driving members 32, 33 is reversed.

Figures 9, 10:
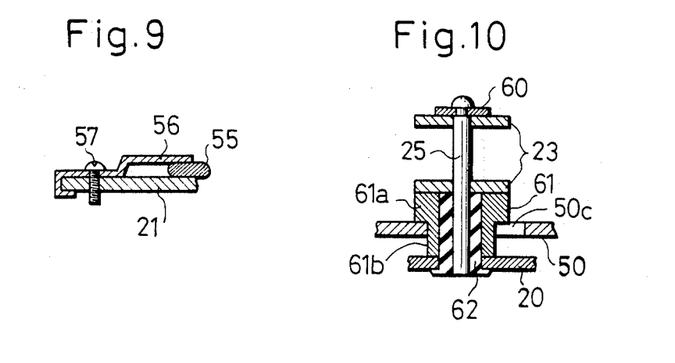
FIG. 9 is a sectional view taken along line X—X of FIG. 2.
FIG. 10 is a sectional view taken along line Y—Y of FIG. 2.

A rising portion 55 is formed on the changeover plate 50 extending slightly beyond one (40) of the reel shafts. Reference numeral 56 represents a guide plate that pushes slightly and guides the intermediate part of the rising portion 55 towards the head base 21. As is best seen in FIG. 9, the base portion of this guide plate 56 is fixed to the head base 21 by a screw 57.

The arrangement of how the pinch roller is fit to the holding frames 23, 24 will now be explained. As can be seen from FIG. 10 which illustrates one of them, the lower end is fixed to the chassis 20 and an E-shaped washer 60 is fit to the upper end. Reference numeral 61 represents a sleeve having an increased diameter portion 61a, a decreased diameter portion 61b, and a corrugated outer shape. The sleeve is interposed between the lower end of the pinch roller holding frame 23 and the chassis 20. Reference numeral 62 represents a bearing that rotatably supports the sleeve 61 and extends from the upper end of the sleeve 61 down to the chassis 20. An elongated hole 50c is defined on the changeover plate 50 in its direction of movement. The width of the elongated hole 50c is smaller than the outer diameter of the increased diameter portion 61a of the sleeve 61 but is slightly greater than that of the decreased diameter portion 61b.

Figure 11:
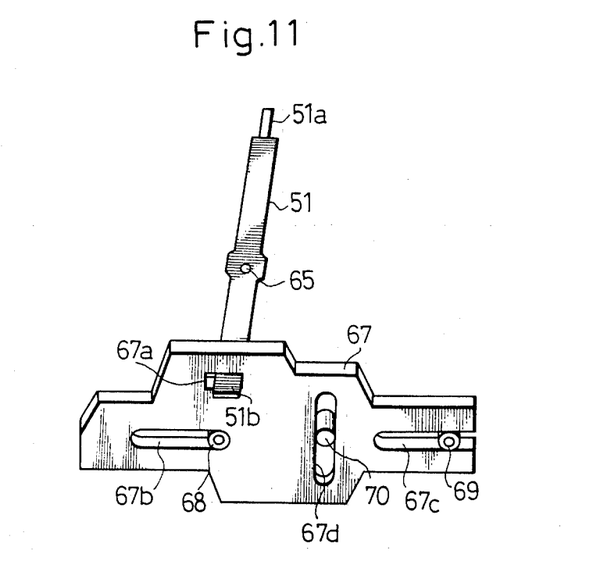
FIG. 11 is a schematic perspective view of a changeover lever forming a part of the changeover mechanism and its associated mechanism.

As shown in FIG. 11, the intermediate part of tha changeover lever 51 is rotatably fitted to the chassis 20 by a pin 65. The upper end 51a of the changeover lever 51 is inserted into a hole 50d that is formed at a position close to the left end of the changeover plate 50 and has the shape of a vertically expanded N. The lower end 51b of the changeover lever 51 is inserted into a small hole 67a bored on a moving plate 67. Two elongated holes 67b, 67c are defined on the moving plate 67 in its direction of movement and one elongated hole 67d is formed in the direction orthogonal to its direction of movement. An operation pin 70 is disposed in this elongated hole 67d.

Figure 7A:
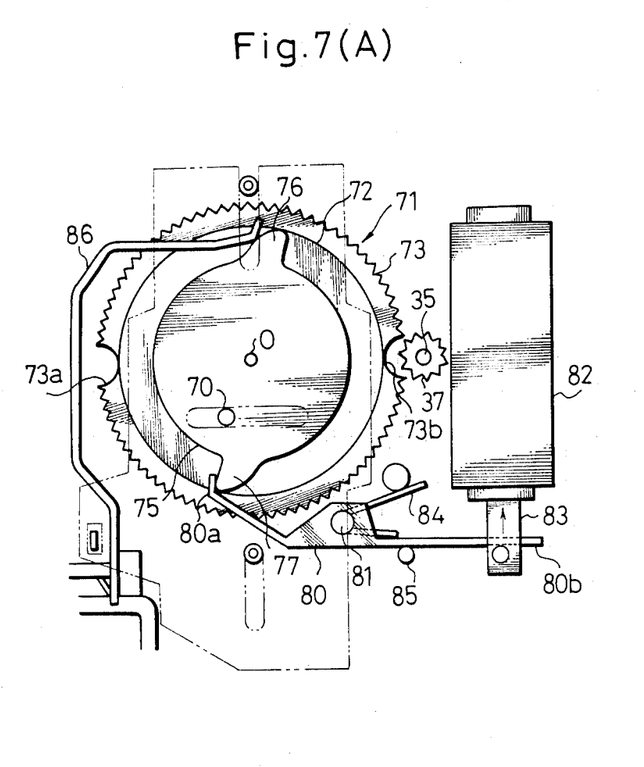
FIGS. 7A and 7B are front views of the changeover mechanism and show its operation.
Figure 7B:
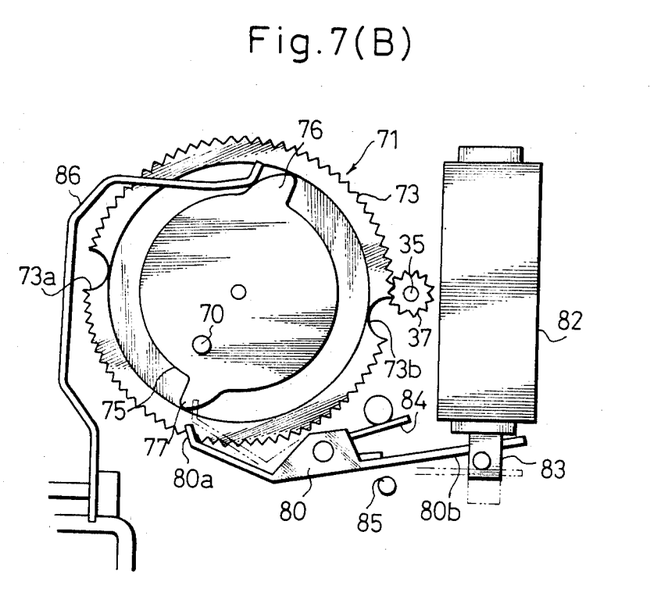
Figure 7C:
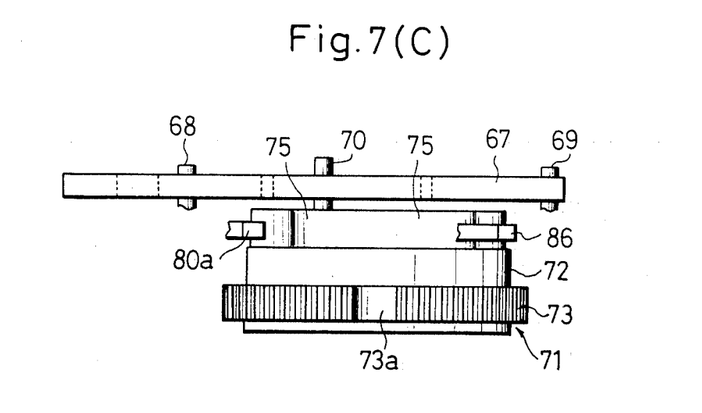
FIG. 7C is a partially cutaway side view of the changeover mechanism shown in FIG. 7A.

As is best seen in FIGS. 7A, 7B and 7C, reference numeral 71 represents a rotary member to which the abovementioned operation pin 70 is fixed. The entire outer shape of this rotary member 71 is substantially convex and a gear 73 is formed at its increased diameter portion 72. This gear 73 engages with the gear 37 fixed to the end of the capstan shaft 35. Two notches 73a, 73b are formed on the gear 73 in its radial direction and the gear 73 cannot engage with the gear 37 at these notches. Curved protuberances 76, 77 having a shape analogous to that of a finger tip are disposed at two positions of the decreased diameter portion 75 of the rotary member 71 pointing in its radial direction. Reference numeral 80 represents a pawl member that is rotatably disposed on a pin 81 and one of its ends 80a of its ends anchors the protuberances 76, 77 while the other 80b is moved vertically in FIG. 6 by the rod 83 of a solenoid 82. Reference numeral 84 represents a spring that normally urges the pawl member 80 clockwise, that is, in the direction in which it anchors the protuberances 76, 77. Reference numeral 85 represents an anchor pin of the pawl member 80. Reference numeral 86 represents a leaf spring that urges the other protuberance 76 clockwise when the one of the protuberances 77 is anchored by the pawl member 80.

The operation of the apparatus of the present invention will now be described.

First, the operation between the play position and the non-play position will be explained. FIG. 2 shows the tape recorder in the stopped state. Under this state, both pinch rollers 27, 28 are kept away from the capstan shafts 35, 36.

FIG. 3 shows the state in which a cassette (not shown) is set at a predetermined position and the tape is being played. In this play mode, the pinch roller holding frame 23 is rotated counter-clockwise and pinch roller 27 is engaged with capstan shaft 35. The other pinch roller 28 does not engage with its capstan shaft 36 and is kept free. The reel shaft 40 serves as a take-up reel shaft and the other reel shaft 41 serves as a feed reel shaft.

Changing over from the stop mode (non-play position) shown in FIG. 2 to the play position shown in FIG. 3 is done in the following manner. First, a drive mechanism (not shown) is actuated so that the head base 21 is moved upward in the drawing and is finally anchored by an anchor mechanism (not shown). Along with the movement of the head base 21, the two pinch roller holding frames 23, 24 also rotate toward the capstan shafts 35, 36 but this operation is restricted halfway by drive members 32, 33 to be described later.

The left anchor pin 53 of the changeover plate 50 disengages from the anchor portion 32d of the driving member 32 while the right anchor pin 54 is positioned immediately above the anchor portion of drive member 33. Accordingly, when the head base 21 is moved upward, the right anchor pin 54 engages with the anchor portion 33d and pushes this anchor portion 33d to the right so that drive member 33 is rotated clockwise about pin 46. The left-hand anchor portion 32d does not engage with anchor pin 53 but advances as such so that the driving member 32 reaches the play position as such.

In the non-play position (or the stop position) shown in FIG. 2, the two drive members 32, 33 are arranged so as to be symmetric with each other, but at the play position shown in FIG. 3 one of the drive members is rotated in the direction away from the capstan shaft.

This will be explained in further detail with reference to FIGS. 4 and 5. The state shown in FIG. 4, corresponds to that shown in FIG. 2. The head base 21 is moved back to the stop position and the driving members 32, 33 are situated at the in most remote positions from the capstan shafts 35, 36. The pinch roller fitting shafts 30 31 are restricted from movement by the holes 32a, 33a of the driving members 32, 33 and by the holes 21a, 21b of the head base 21. When the head base 21 is advanced to the play position, it reaches the state of FIG. 5 which corresponds to that shown in FIG. 3.

In this case, the left driving member 32 advances in that state. The anchor pin 53 on the left is positioned away from the anchor portion 32d of the driving member 32 and movement of the pinch roller fitting shaft 30 is restricted by the hole 32a of the driving member 32 and by the hole 21a of the head base 21 in the same way as in FIG. 4.

In the abovementioned manner, the pinch roller 27 is anchored to the capstan shaft 35. The anchor portion 33d of the other driving member 33 is rotated clockwise by the anchor pin 54 on the side of the changeover plate 50 so that the portion of the hole 33a of the driving member 33 overlapping the hole 21b of the head base 21 becomes relatively larger and the pinch roller fitting shaft 31 becomes free within the range of restriction of these holes. As a result, the pinch roller 28 which is freely rotatably supported by the fitting shaft 31 escapes from the capstan shaft 36 so the capstan shaft 36 and the pinch roller 28 are out of engagement with each other.

Since the left driving member 32 is constantly urged clockwise by spring 47, the pinch roller can engage with the capstan shaft 35 via the tape with the predetermined pressure of the spring force.

When the anchor mechanism (not shown) is again released, the head base 21 returns from the play position to the non-play (stop) position by the action of the springs 42, 43. In the reverse sequence to the above, the anchor pins 53, 54 detach from the driving members 32, 33, respectively, and finally reach the state shown in FIG. 4, resuming their original positions.

Next, the changeover operation of the pinch rollers 27, 28 will be explained.

When the head base 21 advanced to the play position, when the tape reaches its end the solenoid 82 is actuated upon detection of the tape end and its rod 83 is retracted from the state shown in FIG. 7A to the state shown in FIG. 7B. Pawl member 80 is thus rotated counter-clockwise and one end portion 80a of the pawl member 80 is detached from the protuberance 77 of the rotary member 71 as indicated by the solid line in FIG. 7B. As a result, the other protuberance 76 that has been pushed by the tip of the leaf spring 86 is moved slightly to the right by the force of the leaf spring 86 and the rotary member 71 is rotated slightly, thereby reaching the state shown in FIG. 7B. The rod 83 of the solenoid 82 then extends again, the pawl member 80 returns to the state indicated by chain line and the gear 73 of the rotary member 71 is rotated slightly clockwise. The gear 37 fixed to one end of the capstan shaft 35 engages with the leading end of the gear 37 from the notch 73b, the turning force of the gear 37 is consequently transmitted to gear 73 and gear 73 is rotated. When the rotary member 71 has rotated clockwise in this manner by about 180 degrees, the other protuberance 76 engages with the pawl member 80 at the same time the other notch 73a reaches the position of gear 37 so that gear 37 is no longer engaged with gear 73 and the rotary member 71 stops rotating.

Meanwhile, the moving plate 67 shown in FIGS. 7A and 11 has been moved in a predetermined direction along with the rotation of the rotary member 71. That is, as the rotary member 71 rotates, the pin 70 rotates about 180 degrees about 0 and, in this case, the moving plate 67 is moved linearly in a predetermined direction by the operation pin 70. Along with this the lower end 51b of the changeover lever 51 is moved, rotating the changeover lever 51 so that the upper end 51a of the changeover lever 51 moves in the direction opposite to its lower end 51b.

Figure 8:
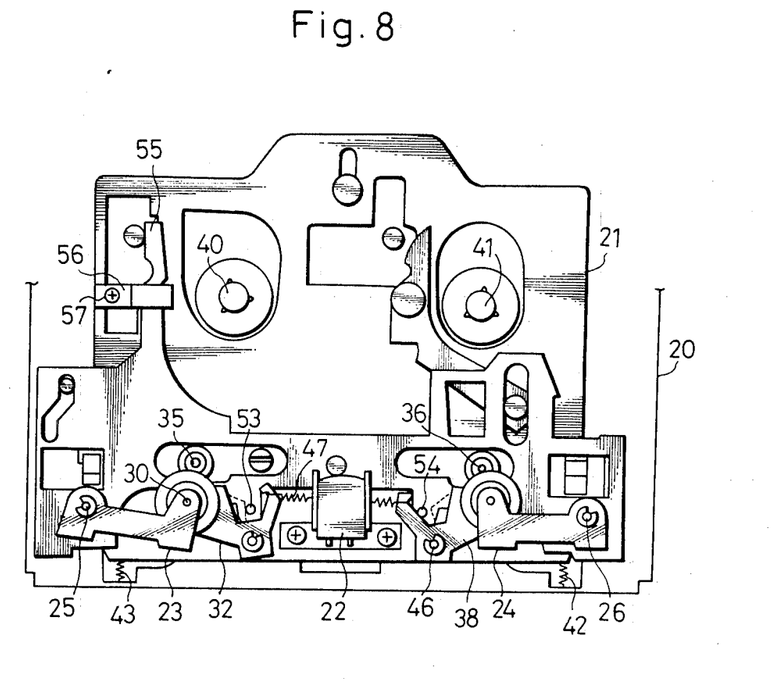
FIG. 8 is a schematic plan view showing the changeover state of the changeover plate corresponding to FIG. 3.

When the changeover lever is changed over to the other side in this manner, the changeover plate 50 moves from the state shown in FIG. 3 to the state shwon in FIG. 8, that is to say, to the left. As a result, the anchor pins 53, 54 of the changeover plate 50 are also moved to the left and the relative positions between these anchor pins and the anchor portions 32d, 33d of the driving members 32, 33 change. That is, when the changeover plate 50 moves as shown in FIG. 8, the left anchor pin 53 comes into contact with the anchor portion 32d of the driving member 32 and pushes it so that the driving member 32 is rotated counter-clockwise, thereby disengaging the pinch roller 27 from the capstan shaft 35. Since the engagement between the other anchor pin 54 with the anchor portion 33d of the other driving member 33 is also released, the pinch roller holding frame 24 is rotated by the force of spring 47 and the pinch rollers 27, 28 reach the state opposite to that shown in FIG. 3, namely, the right pinch roller 28 engages with the capstan shaft 36 and the left pinch roller 27 is disengaged from the capstan shaft 35.

As shown in FIGS. 6 and 7A through 7C, when the ON-OFF operation of the solenoid 82 is repeated, the changeover plate 50 can be automatically changed over between the positions shown in FIGS. 3 and 8. Thus, the pinch rollers 27, 28 can be changed over alternately.

Also, when the changeover plate 50 moves, a reversing mechanism (not shown) operates to reverse the direction of rotation of the reel shafts 40, 41.

As described in the foregoing, in the apparatus of the present invention, a pair of capstan shafts 35, 36 are rotatably disposed on the chassis 20, and first and second pinch rollers 27, 28 corresponding to the respective capstan shafts are also disposed. The first and second pinch rollers 27, 28 are held by first and second pinch roller holding frames 23, 24, respectively, which are rotatably disposed on the chassis 20. The first and second driving members 32, 33 are rotatably fitted to the head base 21. When the head base 21 reaches the play position, the first and second pinch roller holding frames 23, 24 are rotated to drive the first and second pinch rollers 27, 28 toward the capstan shafts 35, 36. The driving members 32, 33 are urged in a predetermined direction by the common spring member 47. Moreover, the changeover mechanism selectively engages the first or second pinch roller 27, 28 with the first or second capstan shaft 35, 36 when the head base 21 reaches the play position. In this case, the same spring 47 is used in common for both pinch rollers 27, 28. When the head base 21 is to be moved, it may be moved against the resilient force of only this spring 47 and can therefore be moved lightly, smoothly and reliably. This arrangement makes it possible to reduce the operating load on the driving mechanism or the like, the power consumption and the size of the apparatus.

What is claimed is:

1. A reversing tape recorder comprising:

a chassis;

first and second capstan shafts rotatably disposed on said chassis;

first and second pinch rollers respectively mounted on first and second pinch roller shafts held in first and second pinch roller holding frames which have respective end portions thereof rotatably anchored on said chassis such that said first and second pinch roller holding frames and pinch rollers are pivotable toward or away from the respective capstan shafts;

a head base movable in parallel with said chassis in a direction toward said capstan shafts to a play position and in an opposite direction to a non-play position, said head base having first and second restriction holes therein;

drive means for moving said head base to said play position;

first and second driving members rotatably mounted on said head base, each having an anchor portion, an engaging portion and a restriction hole portion, said anchor portions of said first and second driving members being disposed toward an inner side between the driving members and having a spring connected between then to bias them toward each other;

first and second anchor pins mounted on said chassis and being engageable with respective engaging portions of said first and second driving members when said head base is moved to the play position, so as to rotate said driving members and their respective restriction hole portions;

said first and second pinch roller shafts having respective fitting shaft ends extending through said first and second head base restriction holes and said first and second driving member restriction holes, respectively, which are arranged to restrict the movements of the respective pinch rollers toward or away from the respective capstan shafts according to the positions of said head base and said driving members such that only one pinch roller engages the corresponding capstan shaft at a time to drive a tape therebetween in one direction; and a changeover mechanism for moving said head base laterally with respect to said chassis such that the engagement of said anchor pins with said engaging portions of said driving members is shifted so that the other pinch roller engages the other capstan shaft to drive the tape therebetween in a reverse direction.

* * * * *